United States Patent

Funayama

[11] 3,782,652
[45] Jan. 1, 1974

[54] COMBINATION SPINNING AND FLY CASTING REEL

[76] Inventor: Charles T. Funayama, 2519 S. Brentwood, Denver, Colo. 80226

[22] Filed: Mar. 9, 1972

[21] Appl. No.: 233,222

[52] U.S. Cl... 242/84.1 R, 242/84.2 R, 242/84.2 H, 242/215
[51] Int. Cl............................................. A01k 89/00
[58] Field of Search.................. 242/84.2 A, 84.2 E, 242/84.2 H, 84.21 R, 84.1 R, 84.3, 215, 84.2 R, 84.21 A

[56] References Cited
UNITED STATES PATENTS

| 3,089,663 | 5/1963 | Kirby | 242/84.2 R X |
| 2,931,592 | 4/1960 | Sloan | 242/84.21 R |
| 2,667,312 | 1/1954 | Denison et al. | 242/84.2 R |

Primary Examiner—Billy S. Taylor
Attorney—Sheridan, Ross & Fields

[57] ABSTRACT

Combination spinning and fly casting reel characterized by a single action rotatable fly line spool, a stationary spinning line spool, a rotatable bail adjacent the stationary spool, disconnectible gearing disposed between the fly line spool and bail, a member carried by the bail adapted to engage or disengage the spinning line in response to relative rotation between the gearing and the bail, and an adjustable friction drag disposed between the fly line spool and the stationary reel body. In the fly casting mode with the gearing disconnected, the fly line reel rotates independently. In the spin reeling mode, with the gearing connected, rotation of the fly line spool rotates the bail.

4 Claims, 4 Drawing Figures

PATENTED JAN 1 1974  3,782,652

3,782,652

COMBINATION SPINNING AND FLY CASTING REEL

BACKGROUND OF THE INVENTION

Fresh water fishing reels are of several general types, each of which has its particular advantage, depending upon the type of fishing with which it is employed. Probably the most simple form comprises a reel spool mounted for rotation and driven by a crank and multiplying ratio gears. They are usually of the "free spool" type which disconnects the gears from the spool during the cast to reduce the inertia of the mass which must be accelerated during the cast. This type of reel is usually best adapted for use with a relatively short or stiff fishing rod and a relatively heavy fishing lure, such as a bass plug or the like, at the end of the line. In larger versions this type is usually employed for ocean fishing, although large spinning reels are becoming quite popular. If the lure is of small mass, however, this type of reel generally is not employed since the mass of the lure is insufficient to accelerate the mass of the spool and line thereon. Thus, the spinning type is generally preferred wherein the line peels off around the periphery of a stationary spool, thus eliminating the necessity of accelerating the mass of a rotary spool. Also, the fishing rod is usually somewhat more limber or flexible than the former type.

In fly fishing, the bait, which may be an artificial fly or a lure or bait which is substantially weightless, the casting line is quite heavy and considerably stronger than the leader to which it is attached. This is necessary since the mass of the line now produces the only accelerating force to project it to the desired casting spot on the water. The fly casting rod may vary, say, between 7 ½ to 9 feet in length and is the most limber or flexible of the various rods employed in fishing. The reel employed with the fly rod, in its simplest form comprises a "single action" spool to which the crank handle is directly connected. With this construction, the fisherman manually strips discrete lengths of the line from the spool each time he increases the length of his aerial cast until the fly is allowed to drop on the water at a desired spot. The retrieve of the line must, of course, be done manually by reverse rotation of the spool. The "automatic" reel operates in substantially the same manner with the exception that a clock-spring, under control of a brake, retrieves slack line and winds it on the spool.

As is well known, and believed apparent from the foregoing, rods and reels are normally matched to each other and one type of reel is seldom employed with a rod of a type other than the one with which the type of reel will properly function.

Fresh water spin fishing and fly fishing may be encountered in closely adjacent areas. For example, let it be assumed that a stream forms the inlet or outlet for a lake. The optimum fishing tackle for the stream may not necessarily be the optimum for that required for the lake. Thus, the stream may be small or flowing through dense brush or other cover where only short fly casts are feasible, or even desirable, which are not ideal conditions for spin casts which are more ideally suited for long casts. Thus, the fisherman may desire to change to spin fishing on the lake where longer casts are usually more desirable. The fisherman may, of course, carry two distinct fishing outfits, each being best adapted to stream or lake fishing; however, it is believed apparent that this is a cumbersome approach to the problem.

Now, if the fishermen were provided with a reel which would serve his fly fishing needs and also his spin fishing needs he could eliminate a part of one outfit and use his reel for a dual purpose. Further, fishing rods are available which may be converted from an optimum fly-fishing rod to an optimum spin-fishing rod, this being attained by utilizing the same butt section to which tips of different stiffness are attached. Also, some rods are now available which are so designed in length, resilience and weight that they may be employed for either fly casting or spin fishing. They are usually a compromise between rods ideally suited for each purpose but enable the fisherman, by changing reels, to fish in both modes. Such rods are ideally suited for fishermen who back-pack into the wilderness or fish remote from a base camp and desire to carry a minimum of equipment.

The desirability for a dual purpose single reel has been recognized in the prior art wherein a rotary fly line spool and a stationary spinning line spool are provided on the same reel, the use of either of which may be selected.

SUMMARY OF THE INVENTION

The present invention relates to a dual purpose spinning and fly casting reel of the general type disclosed in the prior art. It is provided with a rotary fly casting spool and a stationary spin fishing spool, together with its associated rotary bail, as in the prior art, but otherwise differs materially in the mechanism for selectively using the two spools. For example, the fly line spool is of the single action type having a cranking handle affixed directly thereto which eliminates all gearing between the crank and fly line spool. The fly line spool, when declutched from the bail, rotates independently from the bail, and when clutched to the bail rotates with it, this latter feature effecting a considerable reduction in the operating parts of the mechanism and without detracting from the efficacy of the spin fishing mode. An adjustable friction drag is also provided which is operable in either mode of use.

In accordance with the foregoing, principal objects of the invention are to provide a dual purpose fly casting and spinning reel which is extremely simple in design, foolproof in operation, not subject to malfunction and which may be manufactured at minimum cost to thus render it available to all fishermen who desire such type of reel.

Further objects, advantages, and salient features will become more apparent from the detailed description to follow, the appended claims and the accompanying drawing to now be briefly described.

DESCRIPTION OF PREFERRED EMBODIMENT

Figure 1:
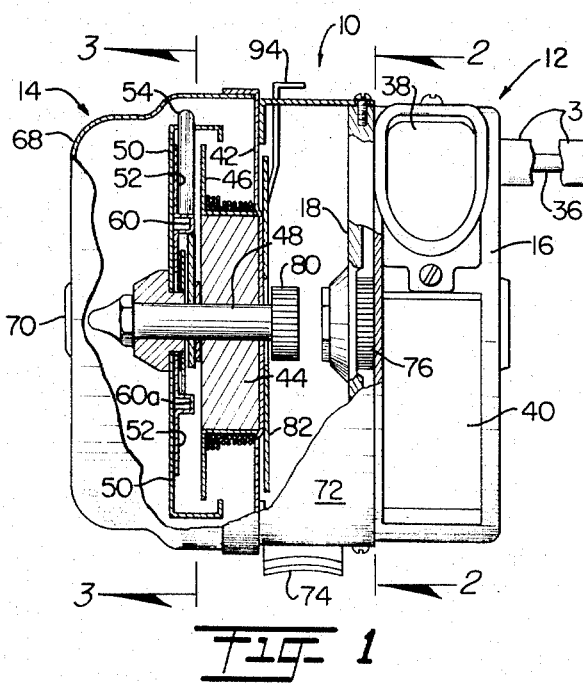
FIG. 1 is a side elevation of the subject of the invention, portions being broken away and certain internal details omitted.

Referring now to the drawing, the subject of the invention comprises, in general, a combination fly casting and spinning reel 10 consisting of a fly casting reel 12 and a spinning reel 14, each of which may be of generally conventional construction, which are coupled together in a novel manner, to be subsequently described, to permit each to be individually employed for its particular purpose.

Fly casting reel 12 comprises a circular cup shaped stationary member 16 which is open at its right end, as viewed in FIG. 1, and closed at its other end by a wall 18. Wall 18 supports one end of a fixed shaft or pintle 20 which rotatably supports a spool 22, formed with spaced side flanges 24 joined by a hub 26. An alternative construction (not shown) is the use of a cylindrical hub integral with the reel body extending over the shaft 20 and journalling the spool 22 on the hub. A friction drag 28 is disposed between the shaft and spool to provide variable drag force on the spool, this being controlled by a threaded knob 30 which may be rotated relative to the shaft to apply variable axial force to a friction washer 32. An axially movable but non-rotatable washer may be provided between the knob and washer (not shown), together with a spring 33, for applying a variable frictional drag force against opposite faces of washer 32. A handle 34, rotatably supported by a pin 36 fixed to the outer flange of the spool is provided for rotating the spool when line is being wound thereon. An opening 38 permits fly line to be stripped from the spool or to be rewound thereon. Other angularly spaced openings 40 may also be provided to lighten the construction by forming a cage-like construction surrounding the spool. The fly line reel, as so far described, is conventional as exemplified by the "Ocean City" reel, model 76D.

Figure 3:
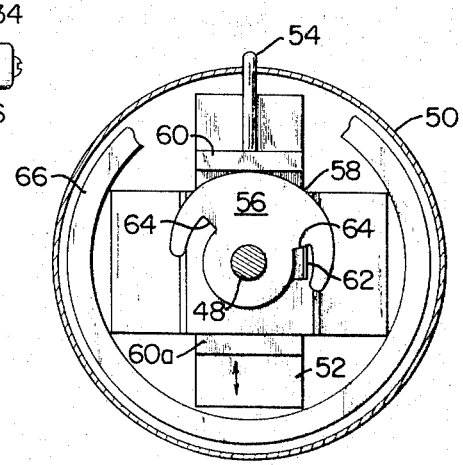
FIG. 3 is a section taken on line 3—3, FIG. 1.

Spinning reel 14 comprises an end wall or partition 42, a central hub 44 and a flange 46 which provides a stationary reel having an annular space for storing the spinning line. A shaft 48 is rotatably carried by the hub which supports a bail cup 50 having limited angular rotation on shaft 48. The bail cup carries a plate 52 which may slide radially relative thereto to which is secured a line pick-up pin 54 which extends through an aperture in the rim of the cup and which may be extended as shown in FIGS. 1 and 3 or be retracted (not shown) depending upon the radial position of plate 52. A cam 56 is affixed to shaft 48, the lobe 58 of which is adapted to engage one or the other of flanges 60 or 60a which project laterally of the plane of plate 52. As shown in FIG. 3, the lobe is in engagement with flange 60 and bail pin 54 is extended. When it is rotated to a substantially diametrically opposite position (not shown) it engages flange 60a and moves pin 54 to retracted position. Plate 52 is also provided with a lateral projection or stop 62 which is disposed in the path of abutments 64 on the cam. These are disposed about 240° apart and contact stop 62 in like reverse rotation of shaft 48 and thus form a drive between shaft 48 and the bail cup at such positions. The bail cup is also provided with a frictional washer 66 which rubs against flange 46 under urge of a light spring (not shown) to provide a slight frictional drag between the bail cup and flange 46. The drag need be only slight and sufficient to hold the bail cup stationary when cam 56 is moved between its two positions relative to plate 52. A cup shaped removable cover 68, having a central aperture 70, encloses the spinning reel mechanism. The spinning reel just described is also of conventional construction as exemplified by the "Fre-Line" reel manufactured by Wright and McGill Co. of Denver, Colo. Suitable speed increasing gearing and a crank (not shown) are provided in the aforesaid construction for rotating shaft 48, these being associated with a circular casing 72 affixed to wall 42. The mechanism disposed within the cylindrical space formed by casing 72 differs from the "Fre-Line" reel, however, which will now be described.

Figure 2:
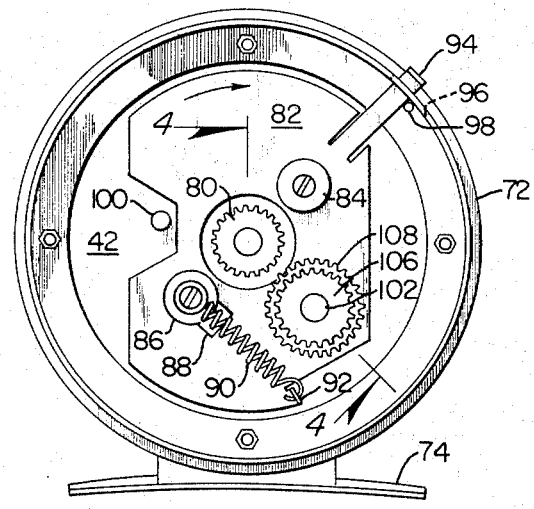
FIG. 2 is a section taken on line 2—2, FIG. 1.
Figure 4:
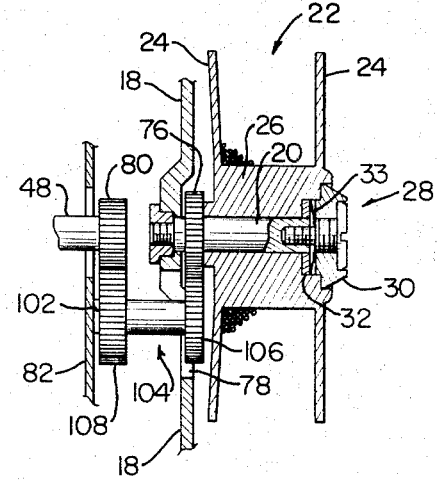
FIG. 4 is a section taken on line 4—4, FIG. 2.

One end of casing 72 is affixed to the periphery of wall 18 of the fly casting reel in any suitable manner, such as by angularly spaced screws, thus forming a common frame interconnecting the two reels which may be affixed to a fishing rod by a conventional reel base 74. A gear 76 is affixed to one end of hub 26 and an aperture 78 is provided through wall 18, neither of which are required in a fly fishing reel employed only for that purpose. A gear 80 of desired pitch diameter is affixed to shaft 48 of the spin casting reel, the two gears referred to being in axial alignment. A plate 82 is disposed in facial engagement with wall 42 and pivotally secured thereto by a shouldered pivot 84. A like shouldered securing member 86 also retains plate 82 against wall 42 and extends through a slot 88 in plate 82. A spring 90 is disposed between slot 88 and a struck-up projection 92 on plate 82 which urges the plate to the position shown in FIG. 2. An alternative construction (not shown) is reducing the size of plate 82 and forming a leaf spring on its end contacting the inner surface of the case to resiliently bias the plate 82. A resilient lever 94, forming a part of plate 82, extends through a slot 96 in casing 72 which may cam across the top of a stop pin 98. As also shown in FIG. 2, lever 94 is restrained from movement against the urge of spring 90. When it is sprung laterally, however, out of engagement with pin 98, the spring rotates the plate in the direction of the arrow until it is arrested by a stop pin 100.

One end of a stub shaft 102 is affixed to plate 82 which rotatably supports a cluster gear assembly 104 having a gear 106 which may mesh with gear 76 and another gear 108 which may mesh with gear 80. Gears 76 and 108 are preferably of larger pitch diameter than gears 106 and 80 to provide a speed increase between spool 22 and bail cup 50. As illustrated, bail cup 50 rotates about 1 ½ revolution to 1 revolution of spool 22. As will be apparent, this ratio may be varied, as desired, by suitable selection of the pitch diameter of the various gears. Also, bevel gears (not shown) may be employed in lieu of spur gears.

As will be apparent, when the apparatus is employed in the fly fishing mode, lever 94 is moved to the position of FIG. 2, thus disengaging the cluster gear assembly from the gears with which it may mesh. When employed in the spin fishing mode, all of the fly line is reeled in and its end is preferably secured to spool 22 in any suitable manner such as by a spring clip (not shown) secured to the face of outer flange 24 or by jamming the end of the line into a saw cut in the periphery of such flange. Lever 94 is then released from its locked position against pin 98 and spring 90 moves the cluster gear to meshed position in which handle 34 may rotate bail cup 50. When handle 34 is rotated in one direction bail pin 54 extends to line retrieving position and when the handle is rotated in the opposite direction bail pin 54 moves to retracted position wherein line may be cast, freely uncoiling around the periphery of the bail cup.

What is claimed is:

1. A fishing reel comprising;
   a. a stationary reel body, b. a fly line spool supported for rotation relative to said body, c. a handle on said spool for rotating same, d. a drag clutch for applying frictional drag between said body and said fly line spool and means for adjusting the frictional drag thereof, e. a bail drive shaft supported for rotation relative to said body about the axis of rotation of said fly line spool, f. a stationary spinning line spool affixed to said body and disposed concentric with said bail drive shaft, g. a disc-like bail member journaled on said bail drive shaft for limited rotation relative thereto, h. a spinning line pick up member carried by said bail member for movement between a retracted position and a position extending outwardly thereof, i. means disposed between said pick-up member and said bail drive shaft for extending and retracting said pick-up member under control of relative rotation between said bail drive shaft and said bail, j. a first gear supported for rotation about the axis of the fly line spool and drivingly connected thereto, k. a second gear secured to one end of said bail drive shaft, l. a cluster idler gear having teeth adapted to engage the teeth of said first and second gears, m. means movably carrying said cluster idler gear on by said body member between a tooth engaging position with the first and second gears and a tooth disengaging positive relative thereto, thereby providing a positive clutch therebetween, n. the construction and arrangement being such that when said cluster idler gear is disengaged, said fly line reel may be rotated independent of rotation of said bail and when said idler gear is engaged, rotation of the fly line spool effects rotation of said bail.

2. A fishing reel in accordance with claim 1, wherein said means for extending and retracting said pick-up member comprises;

p. means for effecting a frictional drag between said bail member and body, q. a cam secured to said bail drive shaft for moving said pick-up member between retracted and extended positions upon limited rotation of said bail drive shaft relative to said bail member, and r. a stop member on said cam for engaging said bail member and rotating same after said pick-up member has been extended.

3. A fishing reel in accordance with claim 1, wherein all of said gears are spur gears.

4. A fishing reel in accordance with claim 1 wherein said gears are so constructed to provide a speed increase ratio between the fly line spool and bail member.

* * * * *